May 18, 1926.

J. DIRSCHAUER 1,584,741

EXTRACTOR FOR VEHICLE WHEELS

Filed Oct. 10, 1925

Inventor:
Jacob Dirschauer

Attorney.

Patented May 18, 1926.

1,584,741

UNITED STATES PATENT OFFICE.

JACOB DIRSCHAUER, OF EVANSVILLE, INDIANA.

EXTRACTOR FOR VEHICLE WHEELS.

Application filed October 10, 1925. Serial No. 61,753.

This invention relates to extractors for vehicle wheels.

My object is to provide an improved, simple, easily applied and removed, easily operated and powerful device which can be applied to the wheel of a vehicle, such as the wheel of an automobile, for the purpose of extracting or withdrawing or pulling the wheel off of its axle or so loosening it therefrom that it may be readily removed.

The invention comprises a body adapted to screw onto the hub of the wheel after the usual hub cap has been removed, which is provided with means for clamping it; a collar or bushing which is pinned to the body in an improved manner to prevent it from turning, and a pressure screw which has screw threaded engagement with the collar or bushing and which, in turn, is adapted to be made to exert pressure on the end of the axle of the vehicle, as hereinafter set forth.

In the accompanying drawing.

Figure 2:
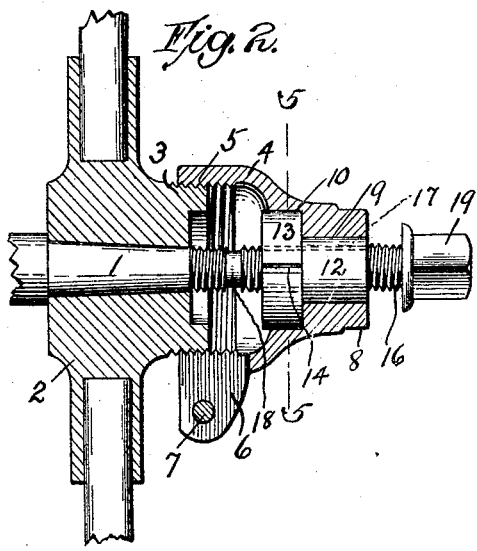
Figure 2 is a section on the line 2—2, Fig. 1.
Figure 1:
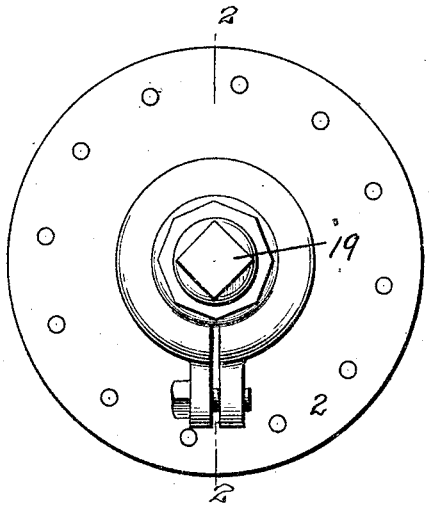
Figure 1 is a front elevation showing the device applied to a wheel.
Figure 4:
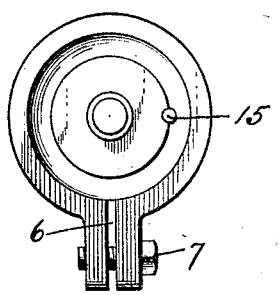
Figure 4 is an inner end view of the device.
Figure 3:
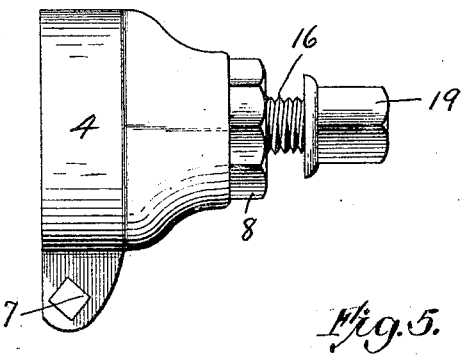
Figure 3 is a side elevation of the device by itself.
Figure 6:
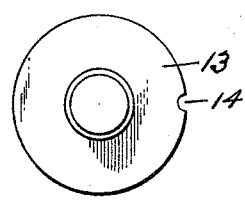
Figure 6 is an end view of the collar or bushing by itself.
Figure 5:
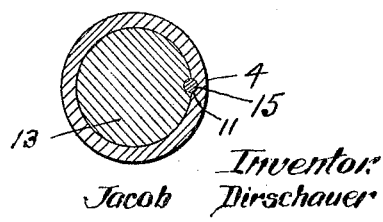
Figure 5 is a section on the line 5—5, Fig. 2.

Referring first to Fig. 2, the axle of a vehicle wheel appears at 1, the wheel being shown at 2; as usual, the hub of the wheel has screw threads 3 onto which screws the usual dust cap.

My improved extractor has a body 4 provided with internal screw threads 5 adapted to engage the screw threads 3, the body being split at 6 and provided with a clamping screw 7 so that it may be tightly clamped onto the hub of the wheel 2 to prevent it from turning. The body also has a nutlike part 8 to enable it to be manipulated by a wrench or spanner.

The body has a bore 9 which is enlarged or countersunk at 10 and there is a groove 11 extending longitudinally of the body in the countersunk part 10.

A collar or bushing is provided which has a body 12 fitting the bore 10 and a head 13 fitting the countersink 10. The head 13 is provided with a groove 14 which, when opposite the groove 11, provides a circular or cylindrical key-seat for a key or pin 15 by which the collar or bushing is locked within the body 4 and prevented from turning.

A pressure screw 16 is threaded through a corresponding screw threaded bore 17 which runs through the collar or bushing, said screw having a blank tip 18 which is adapted to engage the end of the spindle 1. The screw has a polygonal head 19 for the application of a wrench or other tool.

When it is desired to remove the wheel 2 from its spindle 1, the hub or dust cap is unscrewed from the part 3. The extractor is then screwed onto the hub of the wheel and the clamping screw 7 is tightened. The operator then screws up the screw 16 to bring the tip 18 against the end of the spindle. A few turns causes a tremendous pressure to be exerted in the direction of the axis of the spindle 1. A few taps on the screw will increase this pressure very materially and the wheel will then become released from its spindle. When the wheel is removed from its spindle the collar or bushing and the pressure screw slide forward in the body, the pin 15 permitting this movement.

What I claim is:

In an extractor for vehicle wheels, the combination with a body which is adapted to screw onto the hub of the wheel and has means for fastening it thereon so that it will not slip, said body having a round bore provided with a round countersink, of a bushing or collar having a cylindrical body received in said bore and a cylindrical head received in the countersink, a key loosely engaged with seats in the bushing or collar and in the body, said key permitting said bushing or collar to slide but not to turn in relation to the body, and a pressure screw threaded through said bushing or collar and having a tip adapted to engage the end of the wheel spindle.

In testimony whereof I affix my signature.

JACOB DIRSCHAUER.